(12) United States Patent
Vogel, III et al.

(10) Patent No.: US 8,671,182 B2
(45) Date of Patent: Mar. 11, 2014

(54) SYSTEM AND METHOD FOR RESOLVING OPERATING SYSTEM OR SERVICE IDENTITY CONFLICTS

(75) Inventors: William Andrew Vogel, III, Baltimore, MD (US); Andrew Baker, Columbia, MD (US)

(73) Assignee: Sourcefire, Inc., Columbia, MD (US)

( * ) Notice: Subject to any disclaimer, the term of this patent is extended or adjusted under 35 U.S.C. 154(b) by 210 days.

(21) Appl. No.: 12/820,227

(22) Filed: Jun. 22, 2010

(65) Prior Publication Data

US 2011/0314143 A1 Dec. 22, 2011

(51) Int. Cl.
G06F 15/173 (2006.01)
G06F 7/00 (2006.01)

(52) U.S. Cl.
USPC .............................. 709/224; 709/225; 726/22

(58) Field of Classification Search
USPC ............................... 709/223–226; 726/22–26
See application file for complete search history.

(56) References Cited

U.S. PATENT DOCUMENTS

| | | |
|---|---|---|
| 4,550,436 A | 10/1985 | Freeman |
| 4,570,157 A | 2/1986 | Kodaira |
| 4,857,912 A | 8/1989 | Everett et al. |
| 4,912,748 A | 3/1990 | Horii et al. |
| 4,985,863 A | 1/1991 | Fujisawa et al. |
| 5,193,192 A | 3/1993 | Seberger |
| 5,222,081 A | 6/1993 | Lewis et al. |
| 5,404,488 A | 4/1995 | Kerrigan et al. |
| 5,430,842 A | 7/1995 | Thompson et al. |
| 5,459,841 A | 10/1995 | Flora-Holmquist et al. |
| 5,495,409 A | 2/1996 | Kanno |
| 5,497,463 A | 3/1996 | Stein et al. |
| 5,604,910 A | 2/1997 | Kojima et al. |
| 5,646,997 A | 7/1997 | Barton |
| 5,666,293 A | 9/1997 | Metz et al. |
| 5,796,942 A | 8/1998 | Esbensen |
| 5,870,554 A | 2/1999 | Grossman et al. |
| 5,881,269 A | 3/1999 | Dobbelstein |
| 5,901,307 A | 5/1999 | Potter et al. |
| 5,917,821 A | 6/1999 | Gobuyan et al. |
| 5,919,257 A | 7/1999 | Trostle |
| 5,963,942 A | 10/1999 | Igata |

(Continued)

FOREIGN PATENT DOCUMENTS

EP 1 548 998 A1 6/2005
EP 2166725 A1 3/2010

(Continued)

OTHER PUBLICATIONS

Li, Zhichun, et al. Netshield: Matching with a large vulnerability signature ruleset for high performance network defense. Technical Report NWU-EECS-08-07, Northwestern University, 2009.*

(Continued)

*Primary Examiner* — Patrice Winder
*Assistant Examiner* — Julian Chang
(74) *Attorney, Agent, or Firm* — Posz Law Group, PLC

(57) ABSTRACT

A system includes a processor device. The processor device is configured to receive reports of operating system identities for a single host; determine which of the operating system identities are an intersection of the reported operating system identities; and assign the intersection of the reported operating system identities as a resolved operating system identity.

17 Claims, 7 Drawing Sheets

(56) References Cited

U.S. PATENT DOCUMENTS

| | | | |
|---|---|---|---|
| 5,987,473 A | 11/1999 | Jorgensen | |
| 5,995,963 A | 11/1999 | Nanba et al. | |
| 5,999,937 A | 12/1999 | Ellard | |
| 6,002,427 A | 12/1999 | Kipust | |
| 6,141,686 A | 10/2000 | Jackowski et al. | |
| 6,199,181 B1 | 3/2001 | Rechef et al. | |
| 6,219,786 B1 | 4/2001 | Cunningham et al. | |
| 6,240,452 B1 | 5/2001 | Welch, Jr. et al. | |
| 6,259,805 B1* | 7/2001 | Freedman et al. | 382/124 |
| 6,320,848 B1 | 11/2001 | Edwards et al. | |
| 6,321,338 B1 | 11/2001 | Porras et al. | |
| 6,324,656 B1 | 11/2001 | Gleichauf et al. | |
| 6,334,121 B1 | 12/2001 | Primeaux et al. | |
| 6,343,362 B1 | 1/2002 | Ptacek et al. | |
| 6,393,474 B1 | 5/2002 | Eichert et al. | |
| 6,415,321 B1 | 7/2002 | Gleichauf et al. | |
| 6,453,354 B1 | 9/2002 | Jiang et al. | |
| 6,477,648 B1 | 11/2002 | Schell et al. | |
| 6,487,666 B1 | 11/2002 | Shanklin et al. | |
| 6,499,107 B1 | 12/2002 | Gleichauf et al. | |
| 6,539,381 B1 | 3/2003 | Prasad et al. | |
| 6,546,493 B1 | 4/2003 | Magdych et al. | |
| 6,587,876 B1 | 7/2003 | Mahon et al. | |
| 6,590,885 B1 | 7/2003 | Jorgensen | |
| 6,678,734 B1 | 1/2004 | Haatainen et al. | |
| 6,678,824 B1 | 1/2004 | Cannon et al. | |
| 6,684,332 B1 | 1/2004 | Douglas | |
| 6,711,127 B1 | 3/2004 | Gorman et al. | |
| 6,754,826 B1 | 6/2004 | Challenger et al. | |
| 6,766,320 B1 | 7/2004 | Wang et al. | |
| 6,772,196 B1 | 8/2004 | Kirsch et al. | |
| 6,789,202 B1 | 9/2004 | Ko et al. | |
| 6,816,973 B1 | 11/2004 | Gleichauf et al. | |
| 6,851,061 B1 | 2/2005 | Holland et al. | |
| 6,957,348 B1 | 10/2005 | Flowers et al. | |
| 6,983,323 B2 | 1/2006 | Cantrell et al. | |
| 6,993,706 B2 | 1/2006 | Cook | |
| 6,999,998 B2 | 2/2006 | Russell | |
| 7,032,114 B1 | 4/2006 | Moran | |
| 7,047,423 B1 | 5/2006 | Maloney et al. | |
| 7,054,930 B1 | 5/2006 | Cheriton | |
| 7,058,821 B1 | 6/2006 | Parekh et al. | |
| 7,065,657 B1 | 6/2006 | Moran | |
| 7,073,198 B1* | 7/2006 | Flowers et al. | 726/25 |
| 7,076,803 B2 | 7/2006 | Bruton et al. | |
| 7,096,503 B1 | 8/2006 | Magdych et al. | |
| 7,113,789 B1 | 9/2006 | Boehmke | |
| 7,120,635 B2 | 10/2006 | Bhide et al. | |
| 7,133,916 B2 | 11/2006 | Schunemann | |
| 7,134,141 B2 | 11/2006 | Crosbie et al. | |
| 7,152,105 B2* | 12/2006 | McClure et al. | 709/224 |
| 7,174,566 B2 | 2/2007 | Yadav | |
| 7,181,769 B1* | 2/2007 | Keanini et al. | 726/23 |
| 7,231,665 B1* | 6/2007 | McArdle et al. | 726/22 |
| 7,243,148 B2* | 7/2007 | Keir et al. | 709/224 |
| 7,257,630 B2* | 8/2007 | Cole et al. | 709/224 |
| 7,305,708 B2 | 12/2007 | Norton et al. | |
| 7,310,688 B1 | 12/2007 | Chin | |
| 7,313,695 B2 | 12/2007 | Norton et al. | |
| 7,315,801 B1 | 1/2008 | Dowd et al. | |
| 7,317,693 B1* | 1/2008 | Roesch et al. | 370/252 |
| 7,346,922 B2 | 3/2008 | Miliefsky | |
| 7,350,077 B2 | 3/2008 | Meier et al. | |
| 7,363,656 B2 | 4/2008 | Weber et al. | |
| 7,365,872 B2 | 4/2008 | Lawrence et al. | |
| 7,467,202 B2 | 12/2008 | Savchuk | |
| 7,467,205 B1* | 12/2008 | Dempster et al. | 709/224 |
| 7,467,410 B2* | 12/2008 | Graham et al. | 726/23 |
| 7,493,388 B2* | 2/2009 | Wen et al. | 709/224 |
| 7,496,662 B1* | 2/2009 | Roesch et al. | 709/224 |
| 7,496,962 B2 | 2/2009 | Roelker et al. | |
| 7,519,954 B1* | 4/2009 | Beddoe et al. | 717/124 |
| 7,539,681 B2 | 5/2009 | Norton et al. | |
| 7,580,370 B2 | 8/2009 | Boivie et al. | |
| 7,594,273 B2* | 9/2009 | Keanini et al. | 726/25 |
| 7,596,807 B2 | 9/2009 | Ptacek et al. | |
| 7,644,275 B2 | 1/2010 | Mowers et al. | |
| 7,664,845 B2* | 2/2010 | Kurtz et al. | 709/224 |
| 7,673,043 B2* | 3/2010 | Keir et al. | 709/224 |
| 7,680,929 B1* | 3/2010 | Lyon | 709/224 |
| 7,701,945 B2 | 4/2010 | Roesch et al. | |
| 7,716,742 B1* | 5/2010 | Roesch et al. | 726/25 |
| 7,730,011 B1 | 6/2010 | Deninger et al. | |
| 7,730,175 B1* | 6/2010 | Roesch et al. | 709/224 |
| 7,733,803 B2* | 6/2010 | Vogel et al. | 370/254 |
| 7,801,980 B1* | 9/2010 | Roesch et al. | 709/224 |
| 7,805,482 B2 | 9/2010 | Schiefer | |
| 7,805,762 B2* | 9/2010 | Rowland | 726/25 |
| 7,831,522 B1 | 11/2010 | Satish et al. | |
| 7,885,190 B1* | 2/2011 | Roesch et al. | 370/235 |
| 7,949,732 B1* | 5/2011 | Roesch et al. | 709/220 |
| 8,020,211 B2* | 9/2011 | Keanini et al. | 726/25 |
| 8,041,773 B2 | 10/2011 | Abu-Ghazaleh et al. | |
| 8,150,039 B2 | 4/2012 | de Cesare et al. | |
| 8,272,055 B2 | 9/2012 | Wease | |
| 8,289,882 B2 | 10/2012 | Vogel, III et al. | |
| 8,433,790 B2 | 4/2013 | Polley et al. | |
| 2001/0027485 A1 | 10/2001 | Ogishi et al. | |
| 2001/0034847 A1 | 10/2001 | Gaul, Jr. | |
| 2002/0035639 A1 | 3/2002 | Xu | |
| 2002/0066034 A1 | 5/2002 | Schlossberg | |
| 2002/0083344 A1 | 6/2002 | Vairavan | |
| 2002/0087716 A1 | 7/2002 | Mustafa | |
| 2002/0112185 A1 | 8/2002 | Hodges | |
| 2002/0123995 A1 | 9/2002 | Shibuya | |
| 2002/0143918 A1 | 10/2002 | Soles et al. | |
| 2002/0144142 A1 | 10/2002 | Shohat | |
| 2002/0165707 A1 | 11/2002 | Call | |
| 2002/0168082 A1 | 11/2002 | Razdan | |
| 2002/0178271 A1 | 11/2002 | Graham et al. | |
| 2003/0009699 A1 | 1/2003 | Gupta et al. | |
| 2003/0014662 A1 | 1/2003 | Gupta et al. | |
| 2003/0046388 A1 | 3/2003 | Milliken | |
| 2003/0065817 A1 | 4/2003 | Benchetrit et al. | |
| 2003/0083847 A1 | 5/2003 | Schertz et al. | |
| 2003/0093517 A1 | 5/2003 | Tarquini et al. | |
| 2003/0101353 A1 | 5/2003 | Tarquini et al. | |
| 2003/0126472 A1 | 7/2003 | Banzhof | |
| 2003/0140250 A1 | 7/2003 | Taninaka et al. | |
| 2003/0195874 A1 | 10/2003 | Akaboshi | |
| 2003/0212779 A1 | 11/2003 | Boyter et al. | |
| 2003/0212910 A1 | 11/2003 | Rowland et al. | |
| 2003/0217283 A1 | 11/2003 | Hrastar et al. | |
| 2003/0229726 A1 | 12/2003 | Daseke et al. | |
| 2004/0010684 A1 | 1/2004 | Douglas | |
| 2004/0015728 A1* | 1/2004 | Cole et al. | 713/201 |
| 2004/0034773 A1 | 2/2004 | Balabine et al. | |
| 2004/0064726 A1 | 4/2004 | Girouard | |
| 2004/0073800 A1 | 4/2004 | Shah et al. | |
| 2004/0093408 A1* | 5/2004 | Hirani et al. | 709/224 |
| 2004/0093582 A1 | 5/2004 | Segura | |
| 2004/0098618 A1 | 5/2004 | Kim et al. | |
| 2004/0117478 A1 | 6/2004 | Triulzi et al. | |
| 2004/0123153 A1 | 6/2004 | Wright et al. | |
| 2004/0172234 A1 | 9/2004 | Dapp et al. | |
| 2004/0179477 A1 | 9/2004 | Lincoln et al. | |
| 2004/0193943 A1 | 9/2004 | Angelino et al. | |
| 2004/0210756 A1 | 10/2004 | Mowers et al. | |
| 2004/0218532 A1 | 11/2004 | Khirman | |
| 2004/0221176 A1 | 11/2004 | Cole | |
| 2004/0250032 A1 | 12/2004 | Ji et al. | |
| 2004/0268358 A1* | 12/2004 | Darling et al. | 718/105 |
| 2005/0005169 A1 | 1/2005 | Kelekar | |
| 2005/0015623 A1* | 1/2005 | Williams et al. | 713/201 |
| 2005/0044422 A1 | 2/2005 | Cantrell et al. | |
| 2005/0055399 A1 | 3/2005 | Savchuk | |
| 2005/0076066 A1* | 4/2005 | Stakutis et al. | 707/200 |
| 2005/0108393 A1 | 5/2005 | Banerjee et al. | |
| 2005/0108554 A1 | 5/2005 | Rubin et al. | |
| 2005/0108573 A1 | 5/2005 | Bennett et al. | |
| 2005/0113941 A1 | 5/2005 | Ii et al. | |
| 2005/0114700 A1 | 5/2005 | Barrie et al. | |
| 2005/0160095 A1 | 7/2005 | Dick et al. | |
| 2005/0172019 A1 | 8/2005 | Williamson et al. | |

(56) References Cited

U.S. PATENT DOCUMENTS

| | | | |
|---|---|---|---|
| 2005/0188079 A1 | 8/2005 | Motsinger et al. | |
| 2005/0223014 A1 | 10/2005 | Sharma et al. | |
| 2005/0229255 A1 | 10/2005 | Gula et al. | |
| 2005/0240604 A1 | 10/2005 | Corl, Jr. et al. | |
| 2005/0251500 A1 | 11/2005 | Vahalia et al. | |
| 2005/0268331 A1 | 12/2005 | Le et al. | |
| 2005/0268332 A1 | 12/2005 | Le et al. | |
| 2005/0273673 A1 | 12/2005 | Gassoway | |
| 2005/0273857 A1 | 12/2005 | Freund | |
| 2006/0174337 A1 | 8/2006 | Bernoth | |
| 2006/0265748 A1 | 11/2006 | Potok | |
| 2006/0288053 A1 | 12/2006 | Holt et al. | |
| 2006/0294588 A1 | 12/2006 | Lahann et al. | |
| 2007/0027913 A1 | 2/2007 | Jensen et al. | |
| 2007/0058631 A1 | 3/2007 | Mortier et al. | |
| 2007/0143852 A1* | 6/2007 | Keanini et al. | 726/25 |
| 2007/0162463 A1 | 7/2007 | Kester et al. | |
| 2007/0192286 A1 | 8/2007 | Norton et al. | |
| 2007/0192863 A1 | 8/2007 | Kapoor et al. | |
| 2007/0195797 A1 | 8/2007 | Patel et al. | |
| 2007/0271371 A1 | 11/2007 | Singh Ahuja et al. | |
| 2007/0283007 A1* | 12/2007 | Keir et al. | 709/224 |
| 2007/0283441 A1* | 12/2007 | Cole et al. | 726/25 |
| 2007/0288579 A1* | 12/2007 | Schunemann | 709/206 |
| 2008/0115213 A1* | 5/2008 | Bhatt et al. | 726/22 |
| 2008/0127342 A1 | 5/2008 | Roesch et al. | |
| 2008/0133523 A1 | 6/2008 | Norton et al. | |
| 2008/0168561 A1 | 7/2008 | Durie et al. | |
| 2008/0196102 A1 | 8/2008 | Roesch | |
| 2008/0209518 A1 | 8/2008 | Sturges et al. | |
| 2008/0244741 A1 | 10/2008 | Gustafson et al. | |
| 2008/0263197 A1* | 10/2008 | Stephens | 709/224 |
| 2008/0276319 A1 | 11/2008 | Rittermann | |
| 2008/0289040 A1* | 11/2008 | Ithal | 726/23 |
| 2009/0019141 A1 | 1/2009 | Bush et al. | |
| 2009/0028147 A1 | 1/2009 | Russell | |
| 2009/0041020 A1 | 2/2009 | Gibbons et al. | |
| 2009/0055691 A1 | 2/2009 | Ouksel et al. | |
| 2009/0097662 A1 | 4/2009 | Olechowski et al. | |
| 2009/0164517 A1 | 6/2009 | Shields et al. | |
| 2009/0171981 A1 | 7/2009 | Shuster | |
| 2009/0182864 A1* | 7/2009 | Khan et al. | 709/224 |
| 2009/0259748 A1* | 10/2009 | McClure et al. | 709/224 |
| 2009/0262659 A1 | 10/2009 | Sturges et al. | |
| 2009/0271696 A1* | 10/2009 | Bailor et al. | 715/229 |
| 2009/0282481 A1* | 11/2009 | Dow et al. | 726/23 |
| 2009/0307776 A1 | 12/2009 | Curnyn | |
| 2009/0320138 A1* | 12/2009 | Keanini et al. | 726/25 |
| 2010/0050260 A1* | 2/2010 | Nakakoji et al. | 726/23 |
| 2010/0077483 A1 | 3/2010 | Stolfo et al. | |
| 2010/0088767 A1 | 4/2010 | Wease | |
| 2010/0161795 A1* | 6/2010 | Deridder et al. | 709/224 |
| 2010/0257267 A1 | 10/2010 | Sohn et al. | |
| 2010/0268834 A1 | 10/2010 | Eidelman et al. | |
| 2011/0307600 A1 | 12/2011 | Polley et al. | |
| 2012/0233222 A1 | 9/2012 | Roesch | |

FOREIGN PATENT DOCUMENTS

| | | |
|---|---|---|
| GB | 2 432 933 A | 6/2007 |
| WO | WO 01/37511 A2 | 5/2001 |
| WO | WO 2004/100011 A1 | 11/2004 |
| WO | WO 2005/064884 A1 | 7/2005 |
| WO | WO 2006/025050 A2 | 3/2006 |
| WO | WO 2009/032925 A1 | 3/2009 |

OTHER PUBLICATIONS

Auffret, Patrice. "SinFP, unification of active and passive operating system fingerprinting." Journal in computer virology 6.3 (2010): 197-205.*

Gagnon, François, Babak Esfandiari, and Leopoldo Bertossi. "A hybrid approach to operating system discovery using answer set programming." Integrated Network Management, 2007. IM'07. 10th IFIP/IEEE International Symposium on. IEEE, 2007.*

De Montigny-Leboeuf, Annie. A multi-packet signature approach to passive operating system detection. Defense Technical Information Center, 2005.*

Tu, William, et al. "Automated Service Discovery for Enterprise Network Management." (2009).*

Taleck, Greg. "Ambiguity resolution via passive OS fingerprinting." Recent Advances in Intrusion Detection. Springer Berlin Heidelberg, 2003.*

Office Action issued by the U.S. Patent Office on May 31, 2011 in connection with related U.S. Appl. No. 12/688,400.

Notice of Allowance issued by the U.S. Patent Office on Jun. 22, 2011 in connection with related U.S. Appl. No. 11/272,035.

Notice of Allowance issued by the U.S. Patent Office on Jul. 22, 2011 in connection with related U.S. Appl. No. 11/711,876.

Extended European Search Report issued by the European Patent Office on Jul. 19, 2011 in connection with European patent application No. 06837333.1-2413, which corresponds to related U.S. Patent No. 7,733,803.

International Search Report and Written Opinion of the International Searching Authority issued on Jul. 28, 2011 in connection with PCT application No. PCT/US2011/032489, which corresponds to U.S. Appl. No. 13/086,819.

Matthew Olney et al.: "What would you do with a pointer and a size? A New Detection Framework", Apr. 22, 2010 (Apr. 2, 2010), XP55002567, http://labs.snort.org/nrt/sfvrt-nrt.pdf (retrieved on Jul. 12, 2011) the whole document.

R. Hiyoshi, "Practical Guide to Intrusion Detection System: Snort & Tripwire," Japan, Apr. 25, 2004, pp. 57-230 (concise English explanation of relevance attached).

Advisory Action issued by the U.S. Patent Office on Aug. 3, 2010 in connection with related U.S. Appl. No. 10/843,374.

Final Office Action issued by the U.S. Patent Office on Sep. 8, 2010 in connection with related U.S. Appl. No. 10/843,459.

Final Office Action issued by the U.S. Patent Office on Sep. 17, 2010 in connection with related U.S. Appl. No. 11/711,876.

Office Action mailed Sep. 7, 2010 from the Japan Patent Office for Japanese patent application No. 2007-523639 in connection with related U.S. Appl. No. 10/951,796, now U.S. patent No. 7,496,962 (English translation enclosed).

Final Office Action issued by the U.S. Patent Office on Sep. 30, 2010 in connection with related U.S. Appl. No. 11/493,934.

International Search Report and Written Opinion of the International Searching Authority issued on Sep. 1, 2011 in connection with PCT application No. PCT/US2011/035874, which corresponds to U.S. Appl. No. 12/820,227.

Francois Gagnon et al.: "A Hybrid Approach to Operating System Discovery using Answer Set Programming", Integrated Network Management, 2007. IM'07, 10th IFIP/IEEE International Symposium on, IEEE, PI, May 1, 2007, pp. 391-400, XP031182713, ISBN: 978-1-4244-0798-9, p. 293, 394-397.

Final Office Action issued by the U.S. Patent Office on Sep. 14, 2011 in connection with related U.S. Appl. No. 12/230,338.

Office Action issued by the U.S. Patent Office on Oct. 21, 2011 in connection with related U.S. Appl. No. 12/969,682.

Notice of Allowance issued by the Japanese Patent Office on Sep. 30, 2011 in connection with Japanese Patent Application No. 2007-523640, which corresponds to related U.S. Appl. No. 10/898,220, now U.S. Patent No. 7,539,681.

Notice of Allowance issued the by U.S. Patent Office on Oct. 28, 2011 in connection with related U.S. Appl. No. 12/149,196.

Advisory Action issued by the U.S. Patent Office on Nov. 28, 2011 in connection with related U.S. Appl. No. 12/230,338.

Aho et al., "Efficient String Matching: an Aid to Bibliographic Search," *Communications from the ACM* (Jun. 1975), vol. 18, No. 6, pp. 333-340.

Tarjan, et al., "Storing a Sparse Table," Communications of the ACM (Nov. 1979), vol. 2, No. 11, pp. 606-620.

V. Jacobson, et al., Request for Comments: 1323, "TCP Extensions for High Performance," May 1992 (35 pages).

J. Howe, "An Environment for "Sniffing" DCE-RPC Traffic," *CITI Technical Report 93-4*, Jun. 21, 1993, 12 pages total.

T. Ptacek, et al., "Insertion, Evasion, and Denial of Service: Eluding Network Intrusion Detection", Jan. 1998, pp. 1-63.

(56) References Cited

OTHER PUBLICATIONS

R. Gula, "Passive Vulnerability Detection. *Techniques to passively find network security vulnerabilities*," Sep. 9, 1999 (5 pp.).
N. Chase, "Active Server pp. 3.0 from Scratch" (Dec. 1999), Searching for products section, 13 pp.
L. Spitzner, "Passive Fingerprinting," *FOCUS on Intrusion Detection: Passive Fingerprinting* (May 3, 2000), pp. 1-4; obtained from: http://www.stillhq.com/pdfdb/000183/data.pdf.
N. Brownlee, et al., "Methodology for Passive Analysis of a University Internet Link," *PAM2001 Passive and Active Measurement Workshop*, Apr. 2001 (7 pp.).
B. Krishnamurthy, "Web Protocols and Practice," (May 1, 2001), pp. 518-520.
G. Lyon, "Remote OS detection via TCP/IP Stack Fingerprinting"(Jun. 30, 2002), pp. 1-12, obtained from: http://web.archive.org/web20021017063625/www.insecure.org/nmap/nmap-fingerprinting-article.html.
M. Norton, "Multi-Pattern Search Engine" source code, released Mar. 2003 (11 pages total).
U. Shankar and V. Paxson, *Active Mapping: Resisting NIDS Evasion Without Altering Traffic*, Proc. IEEE Symposium on Security and Privacy. May 2003, pp. 1-18.
D. Roelker, "HTTP IDS Evasions Revisited" (Aug. 1, 2003) [online] (retrieved on Nov. 9, 2006). Retrieved from the Internet <URL: http://docs.idsresearch.org/http_ids_evasions.pdf>.
R.P. Lippmann et al., "Passive Operating System Identification from TCP/IP Packet Headers," *Proceedings Workshop on Data Mining for Computer Security* (*DMSEC*), Nov. 2003 (10 pp.).
Norton et al., "Multi-Patten Search Engine Aho-Corasick State Machine" (Mar. 17, 2004), Version 2.0, 36 pp.
R. Deraison, et al., "Passive Vulnerability Scanning: Introduction to NeVO," *Tenable Network Security*, May 30, 2004, pp. 1-13.
Full Band and Matrix Algorithms (Jun. 9, 2004), http://web.archive.org/web20040109154658/http://www.netlib.org/utk/lsi/pcwLSI/text/node150.html.
M. Norton, "Optimizing Pattern Matching for Intrusion Detection" (Jul. 4, 2004) [online] (retrieved on Nov. 9, 2006). Retrieved from the Internet <URL: http://docs.idsresearch.org/OptimizingPatternMatchingForIDS.pdf>.
R. Deraison, et al., "Nessus Network Auditing," *Sungress Publishing*, Jul. 20, 2004, pp. 1-13.
Norton et al., "Sourcefire Optimizing Pattern Matching for Intrusion Detection" (Sep. 2004), 14 pp.
J. Novak, "Target-Based Fragmentation Reassembly" (Apr. 2005), Revision 2.0, pp. 1-32.
S.Siddharth, "Evading NIDS, revisited" (Dec. 12, 2005).
"Snort™ Users Manual 2.6.0," *The Snort Project* (May 23, 2006), pp. 1-126.
"toupper()—convert lowercase character to uppercase," http://www.mkssoftware.com, printed on Sep. 20, 2008 from http://web.archive.org, archive date Jun. 30, 2006, 2 pp.
J. Novak et al., "Target-Based TCP Stream Reassembly" (Aug. 3, 2007), Revision 1.0, pp. 1-23, obtained from: http://www.snort/org/docs/stream5-modelAUg032007.pdf.
"TaoSecurity—Dedicated to FreeBSD, network security monitoring, incident response, and network forensics," (Oct. 1, 2007), obtained from: http://taosecurity.blogspot.com/2005/02/shmoocon-concludes-shmoocon-finished.html.
D. Joseph, et al., "A Policy-aware Switching Layer for Data Centers," *SIGCOMM*, Aug. 17-22, 2008, pp. 51-62.
"Enhanced Operating System Identification with Nessus," *Tenable Network Security* (2007), obtained from: http://blog.tenablesecurity.com/2009/02/enhanced_operat.html, posted by R. Gula on Feb. 16, 2009 (3 pp. total).
Office Action issued by the U.S. Patent Office on Jul. 16, 2007 in connection with related U.S. Appl. No. 10/898,220.
Office Action issued by the U.S. Patent Office on Sep. 6, 2007 in connection with related U.S. Appl. No. 10/843,374.
Notice of Allowance issued by the U.S. Patent Office on Sep. 6, 2007 in connection with related U.S. Appl. No. 10/843,376.
Office Action issued by the U.S. Patent Office on Sep. 26, 2007 in connection with related U.S. Appl. No. 10/843,353.
Office Action issued by the U.S. Patent Office on Oct. 4, 2007 in connection with related U.S. Appl. No. 10/951,796.
Notice of Allowance issued by the U.S. Patent Office on Oct. 5, 2007 in connection with related U.S. Appl. No. 10/793,887.
International Search Report and Written Opinion of the International Searching Authority issued on Oct. 9, 2007 in connection with PCT application No. PCT/US06/43800, which corresponds to U.S. Appl. No. 11/272,034.
Office Action issued by the U.S. Patent Office on Nov. 21, 2007 in connection with related U.S. Appl. No. 10/843,398.
European Search Report issued by the European Patent Office on Nov. 22, 2007 in connection with European patent application No. 07014575.0-1244, which corresponds to related U.S. Appl. No. 11/493,934.
International Search Report and Written Opinion of the International Searching Authority issued on Dec. 5, 2007 in connection with PCT application No. PCT/US05/25583, which corresponds to U.S. Appl. No. 10/951,796.
European Search Report issued by the European Patent Office on Dec. 27, 2007 in connection with European patent application No. 07015003.2-2413, which corresponds to related U.S. Appl. No. 11/501,776.
Office Action issued by the U.S. Patent Office on Jan. 10, 2008 in connection with related U.S. Appl. No. 10/843,373.
Office Action issued by the U.S. Patent Office on Feb. 5, 2008 in connection with related U.S. Appl. No. 10/843,375.
Office Action issued by the U.S. Patent Office on Feb. 21, 2008 in connection with related U.S. Appl. No. 11/272,033.
Office Action issued by the U.S. Patent Office on Mar. 12, 2008 in connection with related U.S. Appl. No. 10/843,459.
Office Action issued by the U.S. Patent Office on Mar. 20, 2008 in connection with related U.S. Appl. No. 10/843,374.
Final Office Action issued by the U.S. Patent Office on May 9, 2008 in connection with related U.S. Appl. No. 10/843,353.
International Preliminary Report on Patentability mailed on May 22, 2008 in connection with PCT application No. PCT/US06/43800, which corresponds to U.S. Appl. No. 11/272,034.
Final Office Action issued by the U.S. Patent Office on Jun. 4, 2008 in connection with related U.S. Appl. No. 10/843,398.
International Search Report and Written Opinion of the International Searching Authority issued on Jun. 19, 2008 in connection with PCT application No. PCT/US05/25584, which corresponds to U.S. Appl. No. 10/898,220.
Final Office Action issued by the U.S. Patent Office on Jun. 26, 2008 in connection with related U.S. Appl. No. 10/898,220.
International Search Report and Written Opinion of the International Searching Authority issued on Jun. 30, 2008 in connection with PCT application No. PCT/US07/21351, which corresponds to U.S. Appl. No. 11/905,980.
International Search Report and Written Opinion of the International Searching Authority issued on Jul. 2, 2008 in connection with PCT application No. PCT/US08/02454, which corresponds to U.S. Appl. No. 11/711,876.
International Search Report and Written Opinion of the International Searching Authority issued on Jul. 7, 2008 in connection with PCT application No. PCT/US06/43820, which corresponds to U.S. Appl. No. 11/272,035.
Office Action issued by the U.S. Patent Office on Jul. 11, 2008 in connection with related U.S. Appl. No. 11/272,034.
Final Office Action issued by the U.S. Patent Office on Jul. 17, 2008 in connection with related U.S. Appl. No. 10/843,459.
Final Office Action issued by the U.S. Patent Office on Aug. 6, 2008 in connection with related U.S. Appl. No. 10/843,375.
Notice of Allowance issued by the U.S. Patent Office on Aug. 18, 2008 in connection with related U.S. Appl. No. 11/272,033.
International Search Report and Written Opinion of the International Searching Authority issued on Aug. 18, 2008 in connection with PCT application No. PCT/US08/05466, which corresponds to U.S. Appl. No. 12/149,196.
Final Office Action issued by the U.S. Patent Office on Aug. 19, 2008 in connection with related U.S. Appl. No. 10/843,373.

(56) References Cited

OTHER PUBLICATIONS

Final Office Action issued by the U.S. Patent Office on Aug. 20, 2008 in connection with related U.S. Appl. No. 10/843,353.
Office Action issued by the U.S. Patent Office on Oct. 6, 2008 in connection with related U.S. Appl. No. 10/843,374.
Notice of Allowance issued by the U.S. Patent Office on Oct. 15, 2008 in connection with related U.S. Appl. No. 10/951,796.
Notice of Allowance issued by the U.S. Patent Office on Oct. 21, 2008 in connection with related U.S. Appl. No. 10/843,375.
European Office Action issued by the European Patent Office on Nov. 28, 2008 in connection with European patent application No. 07 015 003.2-2413, which corresponds to related U.S. Appl. No. 11/501,776.
Office Action issued by the U.S. Patent Office on Dec. 17, 2008 in connection with related U.S. Appl. No. 10/843,398.
Office Action issued by the U.S. Patent Office on Dec. 23, 2008 in connection with related U.S. Appl. No. 11/272,034.
Office Action issued by the U.S. Patent Office on Jan. 16, 2009 in connection with related U.S. Appl. No. 10/843,353.
Office Action issued by the U.S. Patent Office on Jan. 21, 2009 in connection with related U.S. Appl. No. 11/493,934.
Notice of Allowance issued by the U.S. Patent Office on Jan. 21, 2009 in connection with related U.S. Appl. No. 10/898,220.
Office Action issued by the U.S. Patent Office on Feb. 4, 2009 in connection with related U.S. Appl. No. 10/843,373.
Office Action issued by the U.S. Patent Office on Feb. 9, 2009 in connection with related U.S. Appl. No. 10/843,459.
International Preliminary Report on Patentability and Written Opinion of the International Searching Authority mailed on Mar. 3, 2009 in connection with PCT application No. PCT/US05/025584, which corresponds to U.S. Appl. No. 10/898,220.
International Preliminary Report on Patentability and Written Opinion of the International Searching Authority mailed on Mar. 17, 2009 in connection with corresponding PCT application No. PCT/US06/43820, which corresponds to related U.S. Appl. No. 11/272,035.
International Preliminary Report on Patentability mailed on Apr. 7, 2009 in connection with PCT application No. PCT/US07/021351, which corresponds to U.S. Appl. No. 11/905,980.
Office Action issued by the U.S. Patent Office on Apr. 28, 2009 in connection with related U.S. Appl. No. 11/501,776.
Final Office Action issued by the U.S. Patent Office on May 13, 2009 in connection with related U.S. Appl. No. 10/843,374.
Office Action issued by the U.S. Patent Office on May 14, 2009 in connection with related U.S. Appl. No. 11/272,034.
International Search Report and Written Opinion of the International Searching Authority mailed on May 27, 2009 in connection with PCT application No. PCT/US09/02210, which corresponds to U.S. Appl. No. 12/230,338.
Office Action issued by the U.S. Patent Office on Jun. 1, 2009 in connection with related U.S. Appl. No. 11/272,035.
Notice of Allowance issued by the U.S. Patent Office on Jun. 11, 2009 in connection with related U.S. Appl. No. 10/843,373.
Office Action issued by the U.S. Patent Office on Jun. 23, 2009 in connection with related U.S. Appl. No. 11/785,609.
Office Action issued by the U.S. Patent Office on Jul. 6, 2009 in connection with related U.S. Appl. No. 10/843,459.
Office Action issued by the U.S. Patent Office on Jul. 7, 2009 in connection with related U.S. Appl. No. 10/843,398.
Office Action issued by the U.S. Patent Office on Jul. 28, 2009 in connection with related U.S. Appl. No. 10/843,353.
Office Action issued by the U.S. Patent Office on Jul. 30, 2009 in connection with related U.S. Appl. No. 11/493,934.
Office Action issued by the U.S. Patent Office on Aug. 20, 2009 in connection with related U.S. Appl. No. 10/843,374.
International Preliminary Report on Patentability mailed on Sep. 11, 2009 in connection with PCT application No. PCT/US08/002454, which corresponds to U.S. Appl. No. 11/711,876.
Advisory Action issued by the U.S. Patent Office on Sep. 29, 2009 in connection with related U.S. Appl. No. 10/843,459.
European Search Report issued by the European Patent Office on Oct. 12, 2009 in connection with European patent application No. 05773501.1-2201, which corresponds to related U.S. Appl. Nos. 10/898,220, 11/785,609 and 12/010,900.
Final Office Action issued by the U.S. Patent Office on Oct. 29, 2009 in connection with related U.S. Appl. No. 11/501,776.
International Preliminary Report on Patentability mailed on Nov. 12, 2009 in connection with PCT application No. PCT/US08/005466, which corresponds to U.S. Appl. No. 12/149,196.
Advisory Action issued by the U.S. Patent Office on Dec. 2, 2009 in connection with related U.S. Appl. No. 10/843,398.
Notice of Allowance issued by the U.S. Patent Office on Dec. 8, 2009 in connection with related U.S. Appl. No. 11/501,776.
Final Office Action issued by the U.S. Patent Office on Dec. 8, 2009 in connection with related U.S. Appl. No. 11/272,034.
Final Office Action issued by the U.S. Patent Office on Dec. 9, 2009 in connection with related U.S. Appl. No. 11/272,035.
Office Action issued by the U.S. Patent Office on Dec. 17, 2009 in connection with related U.S. Appl. No. 11/493,934.
Notice of Allowance issued by the U.S. Patent Office on Jan. 7, 2010 in connection with related U.S. Appl. No. 10/843,353.
Notice of Allowance issued by the U.S. Patent Office on Jan. 8, 2010 in connection with related U.S. Appl. No. 10/843,373.
Office Action issued by the European Patent Office on Jan. 15, 2010 in connection with European patent application No. 05773501.1-2201, which corresponds to related U.S. Appl. Nos. 10/898,220, 11/785,609 and 12/010,900.
Notice of Allowance issued by the U.S. Patent Office on Feb. 5, 2010 in connection with related U.S. Appl. No. 11/272,034.
Advisory Action issued by the U.S. Patent Office on Feb. 24, 2010 in connection with related U.S. Appl. No. 11/272,035.
Notice of Allowance issued by the U.S. Patent Office on Mar. 5, 2010 in connection with related U.S. Appl. No. 11/785,609.
International Search Report and Written Opinion of the International Searching Authority issued on Mar. 16, 2010 in connection with PCT application No. PCT/US09/59965, which corresponds to U.S. Appl. No. 12/575,612.
Office Action issued by the U.S. Patent Office on Mar. 16, 2010 in connection with related U.S. Appl. No. 11/272,035.
Final Office Action issued by the U.S. Patent Office on Mar. 17, 2010 in connection with related U.S. Appl. No. 10/843,374.
Office Action issued by the U.S. Patent Office on Mar. 22, 2010 in connection with related U.S. Appl. No. 11/493,934.
Office Action issued by the U.S. Patent Office on Apr. 7, 2010 in connection with related U.S. Appl. No. 11/711,876.
Office Action issued by the U.S. Patent Office on Apr. 15, 2010 in connection with related U.S. Appl. No. 12/010,900.
Office Action issued by the U.S. Patent Office on Apr. 21, 2010 in connection with related U.S. Appl. No. 10/843,459.
Notice of Allowance issued by the U.S. Patent Office on May 24, 2010 in connection with related U.S. Appl. No. 10/843,398.
Press Release, "FaceTime Protects Enterprises from Information Leaks over Collaborative Suites like Microsoft OCS and IBM Sametime", issued by FaceTime Communications, Belmont, California, Jul. 14, 2008, retrieved from www.facetime.com/pr/pr080714.aspx, Dec. 1, 2009.
Office Action mailed Mar. 1, 2011 from the Japan Patent Office for Japanese patent application No. 2007-523640 in connection with related U.S. Appl. No. 10/898,220, now U.S. patent No. 7,539,681, U.S. Appl. No. 11/785,609, now U.S. patent No. 7,756,885, and U.S. Appl. No. 12/010,900 (English translation enclosed).
Office Action issued by the U.S. Patent Office on Apr. 6, 2011 in connection with related U.S. Appl. No. 11/711,876.
Office Action issued by the U.S. Patent Office on Apr. 13, 2011 in connection with related U.S. Appl. No. 12/230,338.
Office Action issued by the U.S. Patent Office on May 12, 2011 in connection with related U.S. Appl. No. 12/149,196.
Notice of Allowance issued by the U.S. Patent Office on Apr. 6, 2011 in connection with related U.S. Appl. No. 12/010,900.
PCT International Preliminary Report on Patentability mailed on Apr. 21, 2011 by the International Bureau of WIPO in connection with PCT patent application No. PCT/US2009/059965, which corresponds to U.S. Appl. No. 12/575,612.

(56) References Cited

OTHER PUBLICATIONS

"Snort™ Users Manual 2.2.0RC1," *The Snort Project*, Jun. 28, 2004, Retrieved from the Internet: URL:http://cvs.snort.org/viewcvs.cgi/*checkout*/snort/doc/snort_manual.pdf?rev=1.25&content-type=application/pdf [retrieved on Nov. 18, 2010] (XP002610157).

V. Yegneswaran, et al., "Internet Sieve: an Architecture for Generating Resilient Signatures," May 2004, Retrieved from the Internet: URL:http://www.cc.gatech.edu/~giffin/papers/tr1507/tr1507.pdf [retrieved on Nov. 18, 2010] (XP002610154).

D. Roekler, "HTTP IDS Evasions Revisited," Jan. 8, 2003, Retrieved from the Internet: URL:http://docs.idsresearch.org/http_ids_evasions.pdf [Nov. 18, 2010] (XP002610155).

M. Norton, et al., "The New Snort," *Computer Security Journal*, CSI Security Institute, XIX, No. 3 (Jan. 1, 2003), pp. 37-47, ISSN: 0277-0865 (XP008039475).

European Search Report issued by the European Patent Office on Dec. 6, 2010 in connection with European patent application No. 05773540.9-2413, which corresponds to related U.S. Patent No. 7,496,962.

Notice of Allowance issued by the U.S. Patent Office on Jan. 24, 2011 in connection with related U.S. Appl. No. 10/843,459.

Notice of Allowance issued by the U.S. Patent Office on Feb. 24, 2011 in connection with related U.S. Appl. No. 11/493,934.

Notice of Allowance issued by the U.S. Patent Office on Oct. 5, 2010 in connection with related U.S. Appl. No. 10/843,374.

International Preliminary Report on Patentability mailed on Oct. 19, 2010 in connection with PCT application No. PCT/US2009/02210, which corresponds to U.S. Appl. No. 12/230,338.

Final Office Action issued by the U.S. Patent Office on Oct. 25, 2010 in connection with related U.S. Appl. No. 11/272,035.

Final Office Action issued by the U.S. Patent Office on Nov. 4, 2010 in connection with related U.S. Appl. No. 10/843,459.

Office Action issued by the U.S. Patent Office on Nov. 19, 2010 in connection with related U.S. Appl. No. 10/843,459.

Final Office Action issued by the U.S. Patent Office on Nov. 24, 2010 in connection with related U.S. Appl. No. 12/010,900.

Office Action issued by the U.S. Patent Office on Dec. 22, 2010 in connection with related U.S. Appl. No. 11/905,980.

Notice of Allowance issued by the U.S. Patent Office on Jun. 25, 2012 in connection with related U.S. Appl. No. 12/688,400.

Final Office Action issued by the U.S. Patent Office on Dec. 9, 2011 in connection with related U.S. Appl. No. 12/688,400.

Office Action issued by the U.S. Patent Office on Feb. 2, 2012 in connection with related U.S. Appl. No. 12/688,400.

Office Action issued by the U.S. Patent Office on Feb. 15, 2012 in connection with related U.S. Appl. No. 12/230,338.

Office Action issued by the U.S. Patent Office on Mar. 5, 2012 in connection with related U.S. Appl. No. 12/968,682.

Office Action issued by the U.S. Patent Office on Mar. 19, 2012 in connection with related U.S. Appl. No. 12/813,859.

International Search Report and Written Opinion of the International Searching Authority issued on Apr. 25, 2012 in connection with PCT application No. PCT/US2012/021633, which corresponds to U.S. Appl. No. 13/046,127.

Final Office Action issued by the U.S. Patent Office on May 29, 2012 in connection with related U.S. Appl. No. 12/230,338.

Notice of Allowance issued by the U.S. Patent Office on May 30, 2012 in connection with related U.S. Appl. No. 12/575,612.

Final Office Action issued by the U.S. Patent Office on Jun. 5, 2012 in connection with related U.S. Appl. No. 12/813,859.

Office Action issued by the U.S. Patent Office on Oct. 15, 2012 in connection with related U.S. Appl. No. 12/230,338.

International Preliminary Report on Patentability mailed by the International Bureau of WIPO on Oct. 26, 2012, in connection with corresponding PCT application No. PCT/US2011/032489, which corresponds to related U.S. Appl. No. 13/086,819.

Notice of Allowance issued by the U.S. Patent Office on Jan. 9, 2013 in connection with related U.S. Appl. No. 12/813,859.

Office Action issued by the U.S. Patent Office on Jan. 10, 2013 in connection with related U.S. Appl. No. 12/969,682.

International Preliminary Report on Patentability mailed by the International Bureau of WIPO on Jan. 10, 2013, in connection with corresponding PCT international application No. PCT/US2011/035874.

Office Action issued by the U.S. Patent Office on Feb. 8, 2013 in connection with related U.S. Appl. No. 13/046,127.

Notice of Allowance issued by the U.S. Patent Office on Mar. 14, 2013 in connection with related U.S. Appl. No. 12/230,338.

U.S. Appl. No. 13/779,851, filed Feb. 28, 2013, Polley et al.

Notice of Allowance issued by the U.S. Patent Office on Jul. 12, 2013 in connection with related U.S. Appl. No. 12/969,682.

Notice of Allowance issued by the U.S. Patent Office on Aug. 13, 2013 in connection with related U.S. Appl. No. 13/046,127.

International Preliminary Report on Patentability and Written Opinion of the International Searching Authority mailed on Sep. 26, 2013 in connection with PCT application No. PCT/US2012/021633, which corresponds to related U.S. Appl. No. 13/046,127.

U.S. Appl. No. 14/013,344, filed Aug. 29, 2013, Roesch.

Martin Roesch, "Snort-Lightweight Intrusion Detection for Networks", Proceedings of LISA '99: 13th System Administration Conference, Nov. 12, 1999, pp. 229-238, http://citeseerx.ist.psu.edu/viewdoc/summary?doi=10.1.1.105.6212.

Office Action issued by the European Patent Office on Mar. 20, 2013 in connection with European Patent Application No. 05773501.1-1952 which corresponds to related U.S. Appl. No. 10/898,220 (now patent No. 7,539,631).

Notice of Allowance issued by the Canadian Intellectual Property Office on Apr. 19, 2013 in connection with Canada Patent Application No. 2685292, which corresponds to related U.S. Appl. No. 12/820,227.

Final Office Action issued by the U.S. Patent Office on Apr. 18, 2013 in connection with related U.S. Appl. No. 12/969,682.

Office Action issued by the U.S. Patent Office on May 8, 2013 in connection with related U.S. Appl. No. 13/086,819.

Final Office Action issued by the U.S. Patent Office on Jun. 10, 2013 in connection with related U.S. Appl. No. 13/046,127.

* cited by examiner

201 ⟶

Identity Source Configuration

| Generate Identity Conflict Event | ☐ |
| --- | --- |
| Automatically Resolve Conflicts | (Disabled) ▼ |

✚ Add Identity Source

Identity Source Priority

| Name | Type | Timeout | | |
| --- | --- | --- | --- | --- |
| ◇ 1. Nessus | Scanner | ☐ minutes ▼ | | |
| ◇ 2. nmap | Application | ☐ minutes ▼ | | ⊠ Delete |
| ◇ 3. Sniffer | Application | ☐ minutes ▼ | | |
| ◇ 4. Qualys | Scanner | ☐ minutes ▼ | | ⊠ Delete |
| ◇ 5. SuperFilter 9000 | Scanner | 12 minutes ▼ <br> minutes <br> hours <br> days <br> weeks | | ⊠ Delete |

FIG. 2

Operating System Identity Information 401

| Vendor | Product | Version | Source | Confidence | Created On | |
|---|---|---|---|---|---|---|
| Microsoft, Corp. | Windows 2000 | SP2 | Application: Custom Utility | 100 | 2009-06-19 10:13:10 | ⌧ Delete |
| Microsoft, Corp. | Windows XP | SP3 | Application: Custom Utility 2 | 100 | 2009-06-19 10:13:11 | ⌧ Delete |
| Microsoft | Windows | 2000 SP3 | RNA | 100 | 2009-06-19 10:09:57 | ⌧ Delete |

FIG. 4

Operating System Identity Information 501

✎ Resolve  👁 View

| Vendor | Product | Version | Source | Confidence | | |
|---|---|---|---|---|---|---|
| Microsoft, Corp. | Windows 2000 | SP2 | Application: Custom Utility | Conflict | ✓ Make Current | |
| Linux Online, Inc. | Linux | 2.4, 2.5 | RNA | Conflict | ✓ Make Current | |

FIG. 5

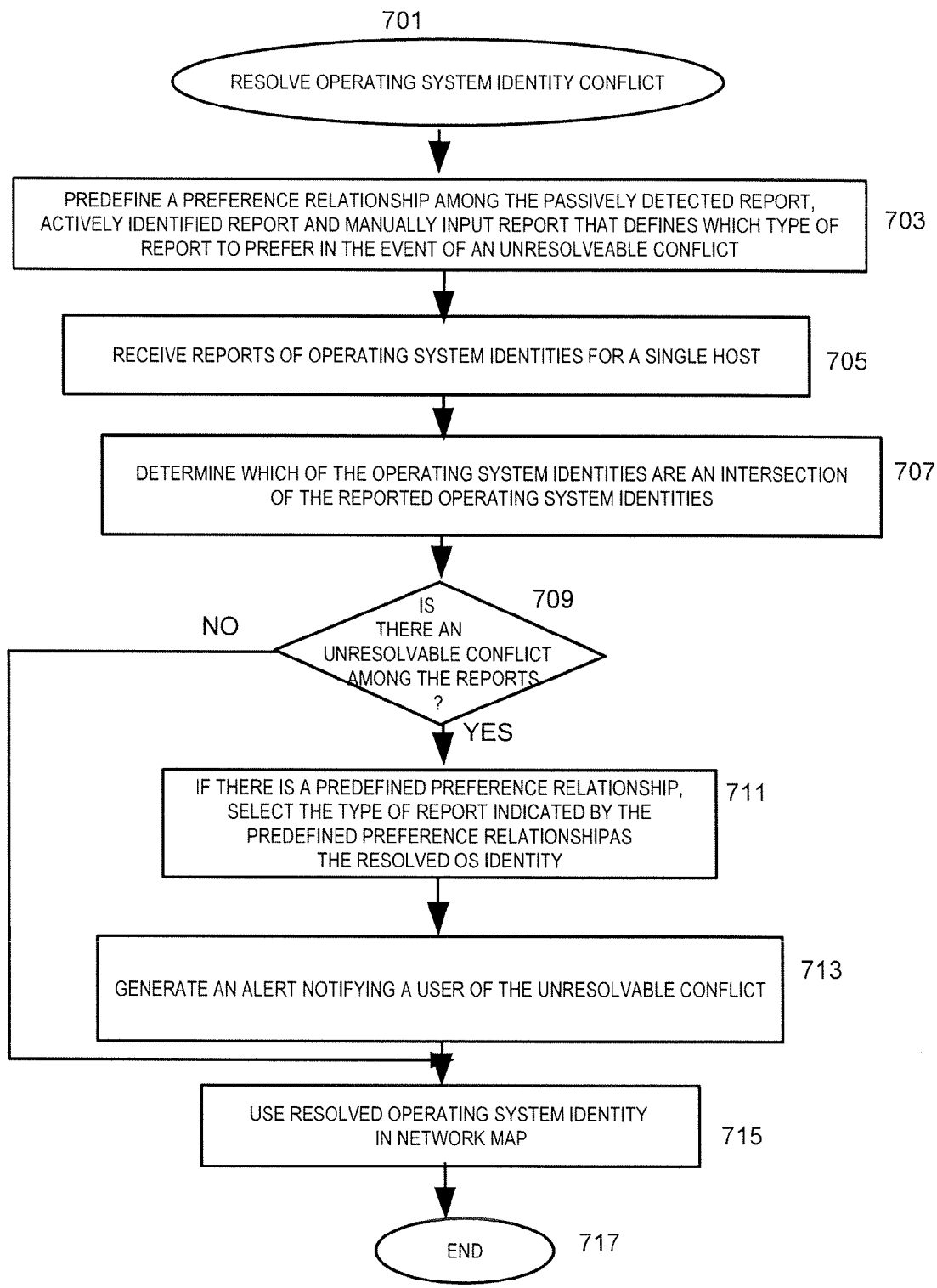

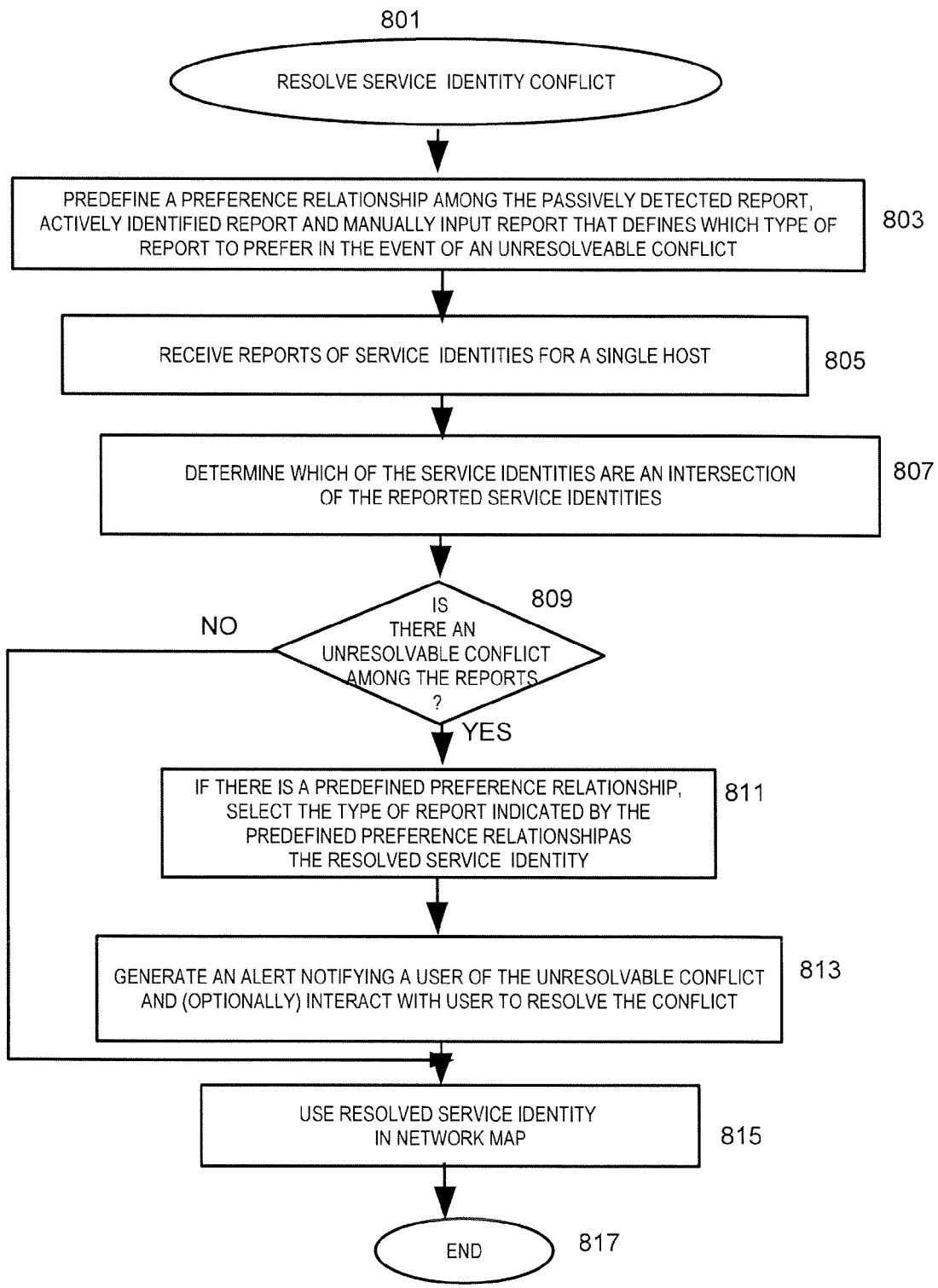

SYSTEM AND METHOD FOR RESOLVING OPERATING SYSTEM OR SERVICE IDENTITY CONFLICTS

TECHNICAL FIELD

The technical field relates in general to communication network management, and more specifically to determining characteristics of devices on the communication network.

BACKGROUND

Operating system identities and service identities can be discovered and use in, for example, network monitoring and management, computer network security, intrusion detection and/or prevention systems, remediation systems, and/or other applications which monitor and/or manage a network or need to know an identity of an operating system or service on a remote host. However, operating system and/or service identities can change over time as hosts are changed out or updated. Furthermore, operating system identities and service identities which are obtained either from passively observing packet traffic, actively scanning a host, and/or manually input by a user are frequently not so detailed as to know precisely which software is on a host, including, e.g., version and update/service pack.

In order to provide a best guess as to operating system identity, conventionally, a system took the highest priority fingerprint and used that as the identity for the host. For example, if one type of fingerprint is usually more accurate than another (such as an SMB fingerprint, which is more accurate than a client fingerprint, which is itself more accurate than a server fingerprint, which is itself more accurate than a DHCP fingerprint). A conventional system rated the fingerprints by type for accuracy level.

Nevertheless, the conventional system is only able to use one of the reported fingerprints as the identity. The fingerprints are weighted as to accuracy. The system picks the likely more accurate fingerprint. Consequently, if the system has an SMB fingerprint, the system stores whatever the SMB fingerprint indicates as the identity of that host.

SUMMARY

Accordingly, one or more embodiments provide methods, systems, and/or computer readable memory mediums, in which there is a processor device. The processor device is configured to: receive reports of operating system identities for a single host; determine which of the operating system identities are an intersection of the reported operating system identities; and assign the intersection of the reported operating system identities as a resolved operating system identity.

According to an embodiment, one report of operating systems is one set of identities to which a host fingerprint maps, the intersection of the reported operating system identities is calculated as a set intersection among the reports of operating system identities for the single host.

Another embodiment further includes assigning more weight to a more reliable type of fingerprint, and providing a confidence level to the resolved operating system identity.

Still another embodiment includes assigning different weights to a same operating system identity based on a fingerprinting method that was used to relate the operating system to a reciprocating host.

In yet another embodiment, the reports are a passively detected report, an actively identified report and a manually input report. Another embodiment includes pre-defining a preference relationship among the passively detected report, the actively identified report and the manually input report that defines which type of report to prefer when there is an un-resolvable conflict among the reports of operating system identities for the single host.

A further embodiment comprises generating an alert when it is determined that there is the un-resolvable conflict among the reports of operating system identities for the single host.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the present invention.

FIG. 2 is an example user interface;

FIG. 4 is a third example user interface;

FIG. 5 is a fourth example user interface;

FIG. 7 is a flow chart illustrating a process to resolve an operating system identity conflict; and FIG. 8 is a diagram illustrating a process to resolve a service identity conflict.

DETAILED DESCRIPTION

Figure 1:
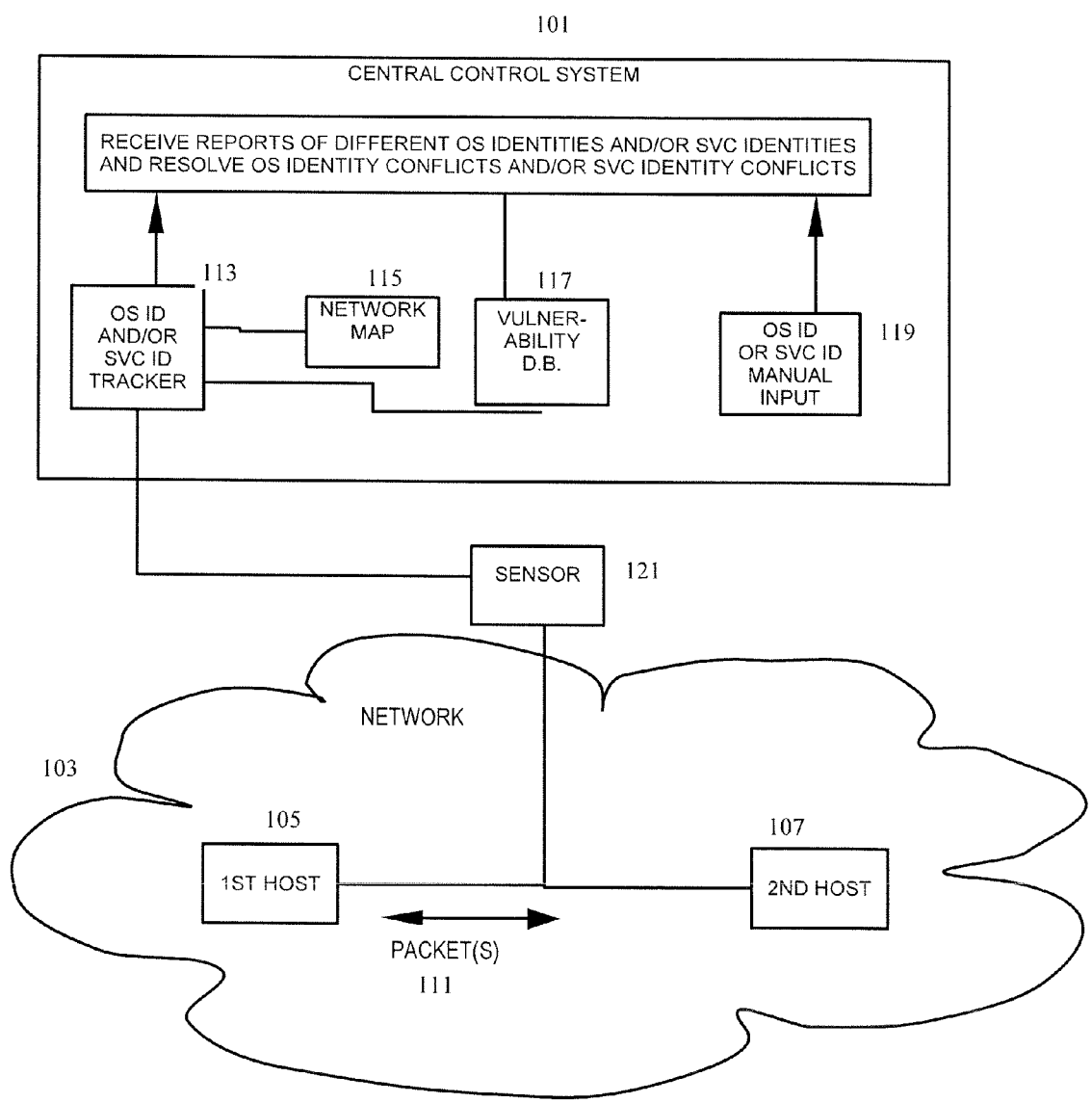
FIG. 1 is a diagram illustrating a simplified and representative environment associated with resolving identity conflicts.

In overview, the present disclosure concerns monitoring and/or managing communication networks, often referred to as packet switching networks, which support communication between a source host and a destination host. Packets on such communication networks may carry information which sometimes suggests, to one degree or another, characteristics of the source and/or destination, resulting in possibly plural reports of alleged possibly different characteristics of the hosts. The characteristics of the hosts can then be used to determine appropriate actions to be taken with respect to such hosts. More particularly, various inventive concepts and principles are embodied in systems, devices, and methods therein for reported characteristics of hosts on a communication network so as to resolve conflicts in the allegedly different characteristics of the same host.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

Relational terms such as first and second, and the like, if any, are used herein solely to distinguish one from another entity, item, or action without necessarily requiring or implying any actual such relationship or order between such entities, items or actions. Some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

Different input methods for determining an operating system (OS) of a host may yield different results. Given that a single OS identity determination is desired for the most accurate management of a host, but instead multiple often conflicting identities are being reported by sensors on a network, a method was needed to use the relative accuracy of each fingerprinting method to automatically gauge the correct single OS identity. Determining a service of a host may face similar issues.

These and other problems in network data security can be addressed by various embodiments for resolving the OS or service identity conflict which are discussed herein.

Further in accordance with exemplary embodiments, multiple fingerprint input methods, from passive sources RNA, and/or from active sources such as active network scanners, can be assigned relative accuracy ratings. Since the available methods and their accuracies may change depending on a customer installation, these ratings may also be configured by the end user. The method can do one or more of the following:

take multiple inputs and assign weights to them based on the input accuracy ratings adjust the weights of each identity based on different metrics, including "last seen" time and network distance between the sensor and target host combine the weighted identities in such a way that each possible identity is assigned a confidence value report the OS identity of the highest confidence identity as the current identity provide automatic and manual conflict resolution methods for choosing between identities with similar confidence.

An embodiment can support the relative weighting of identities and methods for adjustment of the weights given different criteria. Another embodiment can support combining multiple inputs using normalized OS data to assign confidence values to all of the possible identities.

Still another embodiment can allow the end user to adjust the relative weights of active sources so the system can provide more accurate output. Still another embodiment supports automatic and/or manual conflict resolution to direct the system in choosing between multiple possible identities with similar confidence measures.

Referring now to FIG. 1, a diagram illustrating a simplified and representative environment associated with resolving identity conflicts will be discussed and described. There is illustrated in this example a central control system 101 and a network 103. The network includes a 1st host 105 and a 2nd host 107 connected by a communication link over which packets 111 are transmitted according to known techniques. The central control system 101 includes an operating system ID and/or service ID tracker 113, a network map 115, a vulnerability database 117, an operating system ID or service ID manual input section 119, and a section that receives reports of different operating system identities and/or service identities and resolves the identity conflicts 123. Packets 111 transmitted between hosts 105, 107 can be observed by a sensor 121, and the sensor 121 can provide information about the observed packets to the central control system 101, according to known techniques. The illustrated operating system ID and/or service ID tracker 113 is representative of various software which conventionally receives the information from the sensor 121, for example, network monitoring/management software, intrusion detection system, intrusion prevention system, and the like, and which may use the identity for example to provide the network map 115. The vulnerability database 117 is illustrated as being representative of known technology which provides a normalized list of unique operating system and/or service identifiers (unique identifiers for different software products, e.g., operating system, version, patch level, release, and the like). The various packets 111 in the network traffic observed by the sensor 121 can yield different possible operating system and service identifiers; the conflicting reports can be resolved 123 by the section that receives the identifiers and resolves the conflicts, as discussed further herein.

According to known techniques, packets 111 in traffic can be observed going to a web server (such as when a user connects to that server), and the server response can be observed. Because of the different metrics in the response packet (DF, TTL, window size, etc.), the fingerprint can be mapped to, e.g., five server operating systems (Windows, Linux, Sun Solaris, etc.) which are the server fingerprint for the host. Then, when that server makes a connection out (acting as a client), packets in that traffic also have a set of parameters which are observed to become a client fingerprint for that host. The client OS fingerprints tend to be more accurate than the server OS fingerprints. SMB is a WINDOWS file sharing protocol which tends to provide more accurate but also more general information than client or server traffic. DHCP tends to provide the least useful information.

Also, conventionally there is provided the vulnerability database 117 which is a collection, typically normalized, which lists software ids (corresponding to different operating system versions) and their corresponding vulnerabilities. For example, Windows XP Service Pack 2 listed in the vulnerabilities database with its corresponding vulnerabilities. In other words, the vulnerabilities database 117 comprises a list of software ids that a fingerprint references. Each distinct version of an operating system has a software id associated with it. The software ids can conveniently be used in determining the intersection between the operating systems.

A server fingerprint for the host has a list of software ids that it maps to, a client fingerprint for the same host has a different list of software ids that it maps to, a DHCP fingerprint has a different list of software ids that it maps to (if applicable), and a SMB fingerprint has a list of software ids that it maps to (if applicable).

A process or system for calculating a so-called "derived fingerprint" was developed out of the fact that there are usually multiple inputs into the operating system identity for a given host on the network. That is, each fingerprint maps to a specific set of operating systems which it identifies, such as one fingerprint that maps to the operating systems WINDOWS XP, WINDOWS NT 2000, or WINDOWS 98. For example, a single server fingerprint might map to a list of five operating systems as a server, a client fingerprint to a list of three or four operating systems, an SMB fingerprint to a list of two operating systems, etc.

Other inputs can be provided by observing the server-side connections (that is, other systems connecting to the target system). Still other pieces of information can be based on applications that a host may be running such as DHCP or SMB, and the like. In short, there are available a number of different methods of fingerprinting which are known techniques (and which will continue to be developed), for coming up with an operating system identity for a host.

Conventionally, the highest priority fingerprint is used as the identity for the host. That is, one type of fingerprint can be more accurate than another (e.g., an SMB fingerprint is more accurate than a client fingerprint which is more accurate than a server fingerprint which is more accurate than a DHCP fingerprint). The type of fingerprint was rated for accuracy level, but the system was only able to use one of them, but not to combine them.

The relative raw accuracy rating of the fingerprints can be used as a weight to assign to the individual software packages that the fingerprint identifies (operating systems or services) such that an intersection of the fingerprints can be derived using the operating system mappings, as further explained herein. A single fingerprint can be determined that has the highest weighted intersection between the other fingerprints that were detected for the host. Furthermore, the rating can be dynamic and weighted based on all of the input fingerprints for that host.

Conventionally, each fingerprint which is detected can be mapped to a set of operating systems that are the potential operating system for the host, in accordance with known techniques. However, none of the conventional fingerprint mapping methods is accurate to a single revision of an operating system. Nevertheless, by determining a highest weighted intersection of the identities, it can be possible in some instances to define down to a patch level of an operating system.

The relative "accuracy" of a fingerprint can be a raw weighting. Consider an example in which a server fingerprint identifies a host as WINDOWS 2000, XP and Vista, whereas the client fingerprint identifies the same host as WINDOWS XP service pack 2 or WINDOWS 2008. As further explained, the fingerprints can be assigned a relative raw accuracy weighting in this order: DHCP (highest raw accuracy weighting), client, server, and SMB (lowest raw accuracy weighting). For example, all of the server operating systems that were detected can be accuracy weighted as a "2", and client fingerprint operating systems are accuracy weighted as a "4". In this example, the only intersection is for the WINDOWS XP service pack 2, which has a total of 6 (2 for server plus 4 for client), which is higher than a weighting for the other operating systems returned for the host's fingerprints. The intersection with the highest weigh therefore is the most likely identity for that operating system.

Referring now to FIG. 2, an example user interface 201 will be discussed and described. The illustrated user interface 201 is a system policy edit screen for multiple fingerprints. Here, the computer system interacts with the user assign the relative accuracy of identities obtained from external sources which are not already defined to the computer system. The computer system can input a relative accuracy weighting for the user's external sources.

A "Generate identity conflict event" selection can be provided. When enabled, a compliance remediation can be triggered by an identity conflict occurrence, so as to re-scan the host or service with the conflict.

An "Automatically resolve conflicts" selection can be provided to indicate how to automatically without manual intervention resolve conflicts which occur. For example, the automatic conflict resolution can keep the active identity, the passive identity, or the manually input identity; initiate an event, hold the conflict for later, and/or automatically handle the conflict (e.g., re-scan). The identities can be passively detected, actively identified, and/or manually input. Passive, active, and/or manual sources can all be combined and used as above.

An "Identity Source" selection can be provided to list fingerprint source types together with an indication of the priority of the fingerprint. Active sources that have been observed can be listed.

Figure 3:
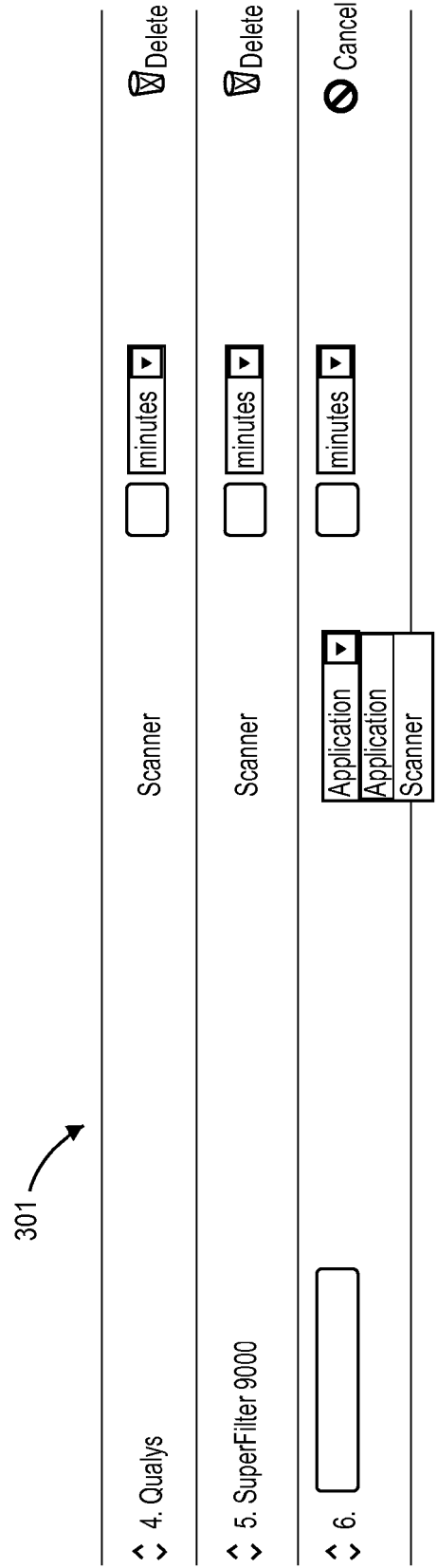
FIG. 3 is a second example user interface.

Referring now to FIG. 3, a second example user interface will be discussed and described. FIG. 3 is similar to FIG. 2, however illustrating the new sources can be added via the user interface 301. The computer system can interact with the user so that sources can be manually added, for example by indicating a name and type of the source which is added. A timeout setting can be input to prune a source from a network map if a fingerprint is not updated within the assigned timeout value.

A user can manually indicate sets of identities for a host, i.e., operating system sets that come from third party devices. The data alternatively can be provided from a scanner, or Nmap, and the like. The identities in the user-provided set can map to a software package identified in a vulnerability database. That is, the user can customize whether a fingerprint identifies one (or more) of the software ids listed in the vulnerability database. The user providing input can indicate the relative accuracy.

Referring now to FIG. 4, a third example user interface will be discussed and described. The user interface 401 illustrated in FIG. 4 is an operating system identity view screen reporting all of the reported operating system or service identities for one host. This user interface 401 can display the data which is being provided for the reported operating system(s). The "Vendor", "Product", and "Version" entries are the resolved operating system identities. (A resolved service can be similarly identified.) The "source" entry is where the derived operating system or service identity was reported from. The "confidence" entry is the confidence level assigned to the resolved operating system or service identity. The current identity can be highlighted or otherwise indicated.

Referring now to FIG. 5, a fourth example user interface will be discussed and described. The user interface 501 illustrated in FIG. 5 reports conflicts among identities. User input information can be stored separately from the fingerprints which the system determines. Many users want to scan their networks with a particular tool, and can prefer their own data to what the system determines. Accordingly, user data can be permitted to override system-determined data regarding a host. Unfortunately, user-input data can become stale over time as computers are replaced. The fingerprint conflict resolution mechanism, such as illustrated in FIG. 5, allows the system to report data which is believed to be stale, reported as an identity conflict. The conflict can be resolved manually by a user, or automatically, e.g., to prefer passive data, or to prefer user-input data, etc., or to re-scan, or to fire an event (e.g., start the remediation system) to handle the conflict, or similar. In this example user interface 501, the user can select which conflicting identity to "make current."

Figure 6:
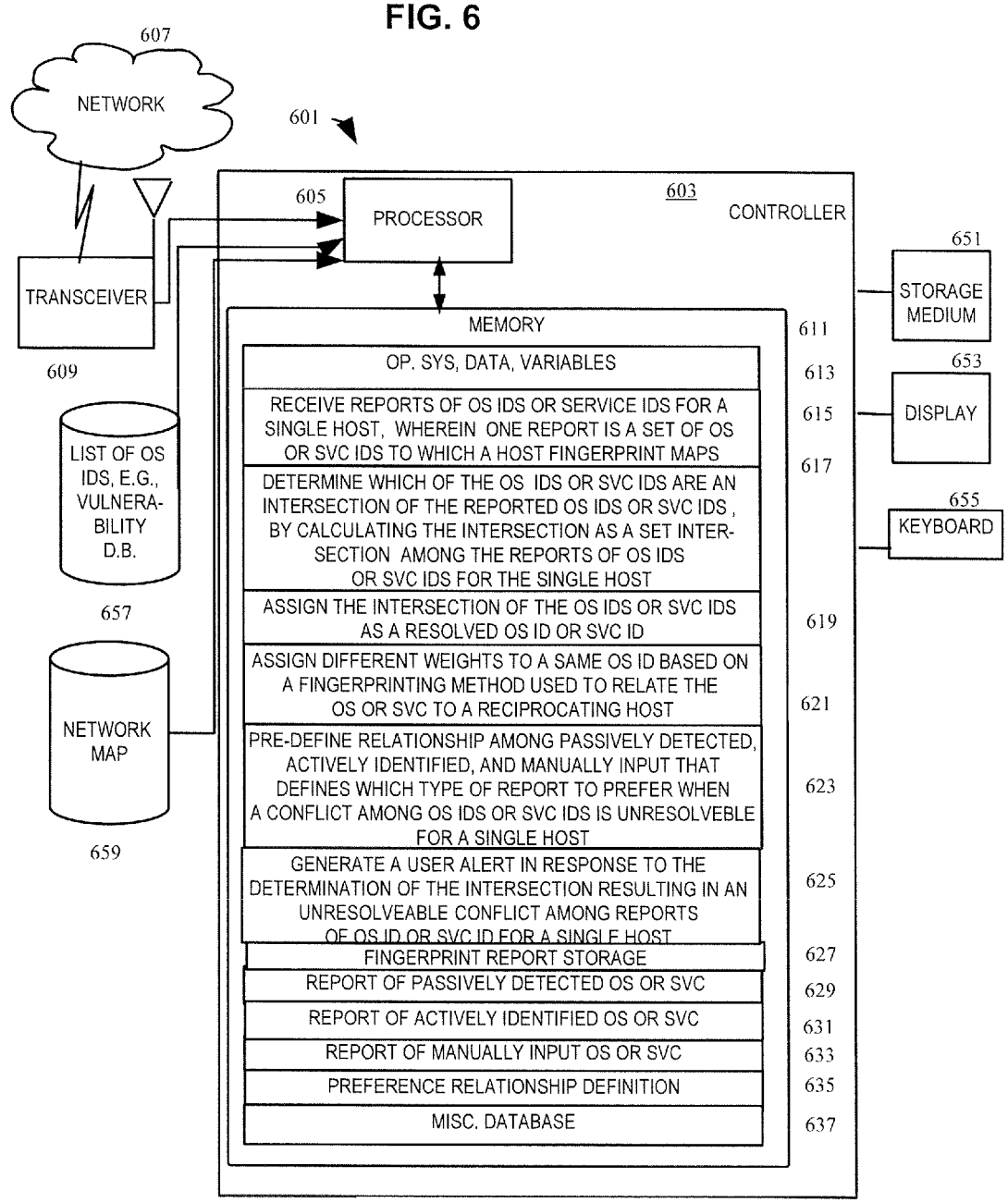
FIG. 6 is a block diagram illustrating portions of an exemplary computer system.

Referring now to FIG. 6, a block diagram illustrating portions of an exemplary computer system will be discussed and described. The computer system 601, sometimes referred to herein as a "system," may include one or more controllers 603, which can receive communications from a network 607 over a transceiver 609 in accordance with known techniques. The transceiver 609 is representative of a receiver and/or transmitter which can be used for wired or wireless communications in accordance with known techniques. The controller 603 can include a processor 605, a memory 611, a display 653, and/or an optional user input device such as a keyboard 655. Additional optional remote or local storage can store a network map 659, a list of operating system or service identities, such as included in a vulnerability database 657, and/or other storage medium 651.

The processor 605 may comprise one or more microprocessors and/or one or more digital signal processors. The memory 611 may be coupled to the processor 605 and may comprise a read-only memory (ROM), a random-access memory (RAM), a programmable ROM (PROM), and/or an electrically erasable read-only memory (EEPROM). The memory 611 may include multiple memory locations for storing, among other things, an operating system, data and variables 613 for programs executed by the processor 605; computer programs for causing the processor to operate in connection with various functions such as to receive 615 reports of operating system identities or service identities for a single host, to determine 617 which of the reported identities are the intersection, to assign 619 the intersection of the operating system identities or service identities as the resolved identity, to assign 621 different weights to the same operating system or service identity based on the fingerprinting method used, the pre-define 623 the relationship among the passively input, actively identified, and manually input identities, and to generate 625 a user alert in response to an unresolveable conflict; fingerprint report storage 627, a report of passively detected identities 629, a report of actively identified identities 631, a report of manually input identities 633, a preference relationship definition 635; and a database 637 for other information used by the processor 605. The computer programs may be stored, for example, in ROM or PROM and may direct the processor 605 in controlling the operation of the computer system 601. Much of the interconnection and relationship between the memory 611, the processor 605, the transceiver 609, the network 607, the display 653, the keyboard 655, the storage medium, 651 and the remote/local databases 657, 659 is technology known to one of the skill in the art and will not be discussed herein.

The processor 605 may be programmed to receive 615 reports of operating system identities or service identities for a single host, wherein one report is a set of operating system or service identifiers to which a host fingerprint maps. The transceiver 609 can be electrically or wirelessly connected to the processor 605 so as to be in mutual communication therewith, in accordance with conventional techniques. The reports of operating system identifiers or service identities can be formatted according to known conventions, for example as sent by sensors, and can be received over the transceiver 609 or in response to a read request from the network map 659, the network map having a conventional form and being maintained for example by a network monitor, an intrusion detection system, or similar. One report has a set or operating system or service identifiers to which a single host fingerprint maps, according to known techniques. That is, the report will include one or plural identifiers which the host may be. Typically, the identifiers are normalized, and it is conventional for the reports to use the operating system identities and service identities which are used in a vulnerability database 657, which uniquely identify an operating system or service by vendor, product, version, and the like (if such detail is possibly identifiable). The report also indicates the single host which it is for. The fingerprint reports which are received optionally may be stored in a fingerprint report storage 629.

The processor 605 can be programmed to determine 617 which of the reported identities are the intersection of the reported operating system identities or service identities. For example, the intersection can be calculated as a set intersection among the reports of operating system identities or service identities for the single host. Further details about determining an intersection are discussed herein. Optionally, the reported identities can be weighted in determining the identity depending on the reliability of the fingerprinting method used to originally determine the identity indicated in the report.

The processor 605 can be programmed to assign 619 the intersection of the operating system identities or service identities as the resolved identity. That is, once the intersection has been determined, it can be used as the resolved identity. The unresolved identities, i.e., reports of passively detected identities 629, actively identified identities 633, and/or manually input identities 633 can be stored for later use, such as for resolving conflicts or changing weights or responding to a changed preference relationship.

The processor 605 can be programmed to assign 621 different weights to the same operating system or service identity based on the fingerprinting method used to relate the operating system or service to a reciprocating host. The phrase "used to relate the operating system to a reciprocating host" can mean that the host sent the packets on which the fingerprint is based as a server, the host sent the packets on which the fingerprint is based as a client, the host used DHCP to send the packets on which the fingerprints were based, or the host used SMB to send the packets on which the fingerprints were based, or similar. The phrase "used to relate the service to a reciprocating host" can mean that the host sent the packets on which the fingerprint is based as a server, the host sent the packets on which the fingerprint is based as a client, the host used DHCP to send the packets on which the fingerprints were based, or the host used SMB to send the packets on which the fingerprints were based, or similar. As discussed herein, the weights which are assigned recognize that some of the fingerprinting methods that are used to relate the operating system to a reciprocating host tend to be more reliable than others. Fingerprinting methods which tend to be more reliable can be assigned more weight.

The processor 605 can be programmed to pre-define 623 the relationship among the passively detected, actively identified, and manually input identities that defines which type of report to prefer when a conflict among operating system identities or service identities is unresolveable for a single host. It is possible for the reports to have no intersection, for example, when a computer is replaced. The computer system 601 can be programmed so that the user can select which identity to use. For example, a computer system might be set up to use the user-input identity if there is an unresolveable conflict, or to use an actively identified identity. Further, the computer system 601 might be programmed to use a most recent of the actively identified or passively detected identities in preference to an older manually input identity. The processor 605 can be programmed to store the preference relationship definition 635 that indicates which of the relationships should be preferred.

The processor 605 can be programmed to generate 625 a user alert in response to the determination of the intersection resulting in an unresolveable conflict among reports of the operating system identity or service identity for a single host. That is, an alarm may be generated, the user may be notified, a user may be prompted to start an active scan, a user may be prompted to start a remediation, or similar.

It should be understood that various logical groupings of functions are described herein. Different realizations may omit one or more of these logical groupings. Likewise, in various realizations, functions may be grouped differently, combined, or augmented. Furthermore, functions including those identified as optional can be omitted from various realizations. Similarly, the present description may describe or suggest a database or collection of data and information. One or more embodiments can provide that the database or collection of data and information can be distributed, combined, or augmented, or provided locally (as illustrated) and/or remotely (not illustrated).

FIG. 7 and FIG. 8 are flow charts illustrating processes to resolve operating system identity conflict and service identity conflict, respectively. Either or both of the procedures can advantageously be implemented on, for example, a processor of a computer system described in connection with FIG. 6 or other apparatus appropriately arranged.

Referring now to FIG. 7, a flow chart illustrating a process 701 to resolve an operating system identity conflict will be discussed and described. In overview, the process 701 can predefine 703 a relationship among the types of reports that defines which type of report to prefer if there is an unresolveable conflict, receive 705 reports of operating system identities for a single host, determine 707 the intersection of the operating system identities; if there is 709 an unresolveable conflict among the reports, and if there is 711 a predefined preference relationship the preferred type of report is selected; in any event, when there is 709 an unresolveable conflict among the reports, the process 701 can generate 713 an alert; then the process 701 can use 715 the resolved operating system identity. Each of these is discussed in more detail below, unless sufficient detail was provided above.

The process 701 can predefine 703 a relationship among the types of reports that defines which type of report to prefer if there is an unresolveable conflict. For example, a preference relationship might define which of a passively detected report, actively identified report, and manually input report is to be used. The preference relationship might be global to a system, or might be local to specific hosts, or the like. For example, the preference relationship might define that a manually input report is to be used for a specific host, whereas the actively identified report is preferred for other hosts, when there is an unresolveable conflict.

An unresolveable conflict can be declared when there is no overlap among the operating system identities' vendor; or no overlap among the operating system identities' vendor and product; or vendor, product, and version, in the reports.

The process 701 can receive 705 reports of operating system identities for a single host, as discussed previously. The process 701 can determine 707 the intersection of the operating system identities, as further discussed herein.

The process 701 can check whether there is 709 an unresolveable conflict among the reports; if there is an unresolveable conflict, the process 701 can check whether there is 711 a predefined preference relationship the preferred type of report is selected. If there is 711 a predefined preference relationship, the process 701 can select the one of the received reports as indicated by the predefined preference relationship as the resolved operating system identity.

In any event, when there is 709 an unresolveable conflict among the reports, the process 701 can generate 713 an alert. It will be appreciated that another implementation of the process might not generate 713 an alert if the predefined preference relationship is used.

Then the process 701 can use 715 the resolved operating system identity, for example, in a network map, in an intrusion detection system in a network monitoring and management process, a computer network security process, a, intrusion detection and/or prevention system, a remediation system, and/or in another application which monitors and/or manages a network or needs to know an identity of an operating system or service on a remote host. Then, the process 701 can end 717.

Referring now to FIG. 8, a diagram illustrating a process 801 to resolve a service identity conflict will be discussed and described. Much of FIG. 8 is repetitive of FIG. 7, except dealing with a service identity instead of an operating system identity. The principals will be appreciated without repeating the above. However, an overview is provided.

In overview, the process 801 can predefine 803 a relationship among the types of reports that defines which type of report to prefer if there is an unresolveable conflict among service identities, receive 805 reports of service identities for a single host, determine 707 the intersection of the service identities; if there is 809 an unresolveable conflict among the reports, and if there is 811 a predefined preference relationship the preferred type of report is selected; in any event, when there is 809 an unresolveable conflict among the reports, the process 701 can generate 813 an alert; then the process 801 can use 815 the resolved service identity before ending 817.

Moreover, embodiments can include a computer system configured with the foregoing tangible computer-readable medium and/or method(s); and/or a communication network comprising at least one computer system configured with the foregoing computer-readable medium and/or method(s).

The following section discusses various examples of determining the intersection of the reported operating system (or service) identities.

Determining an Intersection

In a first embodiment, the intersection between the sets can be determined using finite set theory. In a second embodiment, when the intersection is calculated, the accuracy rating is used to provide a weight for the items in the set, so as to give higher priority to fingerprints that have a higher accuracy rating. Thus, disparate information (e.g., server and client ids) can be used, and the intersection can be reduced to a smaller list of operating systems.

In the following examples, the possible software ids include 1, 2, 3, 4, 5, and 6.

First Example

Determine Intersection of Reported Identities

Reports of OS identities resulting from two server fingerprints for the same host are received. The sets of OS identities in the first and second server type of reports are (1, 2, 3) and (3, 4, 5), respectively.

An intersection between sets {1, 2, 3} and {3, 4, 5} is calculated to be {3}. Hence, the resolved OS identity is 3.

In this example, the reports are all the same type of fingerprinting method and hence are assigned the same weight. A simple set intersection can be determined using simple finite set theory.

Second Example

Determine Intersection of Reported Identities

The following reports of OS identities for the same host are received:
{1, 2, 3} (server type of report)
{4, 5, 6} (server type of report)
{3, 4, 5} (client type of report)
{3, 4} (SMB type of report)

Using this method, the set of reports of OS identities from the same type of report are added together. Thus, {3, 4} is the intersection of the different types of reports because 100% of different types of reports of fingerprints agree. Coincidentally, the weighted intersection yields the same resulting set.

This is not the same as so-called confidence rating, which operates on the global subset of returned operating systems. This method can yield different, superior results over simply counting which operating system is identified most frequently.

Third Example

Determine Weighted Intersection of Reported Identities

The following reports of OS identities for the same host are received:
{1, 2, 3} (server type of report)
{4, 5, 6} (server type of report)
{3, 4, 5} (client type of report)
{5, 6} (SMB type of report)

In this example, the identities in each report are assigned a weight depending on the type of report, referred to herein as an "input accuracy weight". Other weights can be used alone or in combination, for example, "last seen" time and network distance between the sensor and target host. The weight of a DHCP type of a report is 1, the weight of a server type of report is 2, the weight of client type of report is 4, and the weight of SMB type of report is 6.

The total maximum possible for any software identified in the list ("total max")=14. The total weight of each of the OS identities is calculated as in Table 1.

TABLE 1

| OS ID | Total Weight for ID | Weighted Intersection of ID (Confidence Level) |
|---|---|---|
| 1 | 2 | 2/14 = 0.143 |
| 2 | 2 | 2/14 = 0.143 |
| 3 | 2 + 4 = 6 | 6/14 = 0.429 |
| 4 | 2 + 4 = 6 | 6/14 = 0.429 |
| 5 | 2 + 4 + 6 = 12 | 12/14 = 0.857 |
| 6 | 2 + 6 = 8 | 8/14 = 0.571 |

The software ID 5 is weighted a 12; 86% is the confidence level for the operating system ID being 5. The list of software ids, such as in the vulnerability database, informs which operating system is indicated by software ID 5, e.g., Windows 98.

Note that the total weight for an identity increases as that identity occurs more frequently, as well as the total max increasing. A recurrence of an operating system id reinforces the possibility of that identity. In practice this method was observed to work very well. In the real world, there are disparate fingerprints which disagree on some points and agree on others. This method tends to be more correct in selecting which of the disparate operating system ids are more likely.

Fourth Example

The following reports of OS identities for the same host are received:
{1, 2, 3} (server type of report)
{4, 5, 6} (server type of report)
{1, 2, 3} (server type of report) ((each individual s/w id gets +2 added))
{3, 4, 5} (client type of report)
{5} (SMB type of report)

The same input accuracy weight as in the third example is used.

The total max for the five reports is 16: 6+4+2+2+2. The total weight of each of the OS identities is calculated as in Table 2.

TABLE 2

| OS ID | Total Weight for ID | Weighted Intersection of ID (Confidence Level) |
|---|---|---|
| 1 | 2 + 2 = 4 | 4/16 = 0.25 |
| 2 | 2 + 2 = 4 | 4/16 = 0.25 |
| 3 | 2 + 2 + 4 = 8 | 8/16 = 0.5 |
| 4 | 2 + 4 = 6 | 6/16 = 0.375 |
| 5 | 2 + 4 + 6 = 12 | 12/16 = 0.75 |
| 6 | 2 | 2/16 = 0.125 |

The software ID 5 is weighted a 12; there is a confidence level of 75% that the operating system ID is 5.

It should be noted that the communication networks of interest include those that transmit information in packets in accordance with packet processing protocols, for example, by packet switching networks that transmit data, where the packet(s) are generated by a source, the packets are transmitted, and the packets are routed over network infrastructure devices, which are sent to a destination specified in the packet(s). Such networks include, by way of example, the Internet, intranets, local area networks (LAN), wireless LANs (WLAN), wide area networks (WAN), and others. Protocols supporting communication networks that utilize packets include one or more of various networking protocols having any link layers that support the TCP transport layer, or any application that rides over the transport layer, for example, IPV4 or IPV6, and other wireless application protocols or wireline application protocols and/or other protocol structures, and variants and evolutions thereof. Such networks can provide wireless communications capability and/or utilize wireline connections such as cable and/or a connector, or similar.

The designation "packet" is defined herein as a unit of data formatted in accordance with a packet processing protocol such as IPV4 or IPV6, carried by a packet switching network and includes a header and data, and is sometimes referred to as an IP packet or a datagram.

The term "intersection" is defined herein to mean a mathematical set intersection according to set theory, that is, the intersection of the sets A and B, denoted A∩B, is the set of all objects that are members of both A and B; the intersection of {1, 2, 3} and {2, 3, 4} is the set {2, 3}. An "intersection" can be weighted, as discussed above.

A "passively detected" report is defined herein as being developed from one or more packets which were not elicited or initiated by the host on which the packet is read. To "passively detect" a packet is to receive a packet which was not elicited or initiated by a prior transmission from the processor on which the packet is read. An "actively identified" report is defined herein as being developed from one or more packets which were elicited or initiated by the host on which the packet is read, for example, by the host on which the packet is read pinging the host which is in the report.

The term "fingerprint" and "fingerprinting" refer to studying packets sent on a network in order to determine what operating system or service a host is running by checking fields in packet headers against the usual settings in those fields for various different operating systems or services. The method of "fingerprinting" is defined as inputting the packet information and thus determining the likely operating system or service in this way; the "fingerprint" is the set of likely operating systems or services which is returned from the fingerprinting method.

The designation "sensor" is defined herein expressly to indicate a device including a processor whose primary functions are to detect and reports network traffic on the network to which it is attached, sometimes referred to as a security appliance, security device, or sensor appliance, and can be standalone or incorporate one or more of: a firewall, an anti-virus scanning device, a content filtering device, an intrusion detection appliance, an intrusion prevention appliance, a penetration testing appliance, a vulnerability assessment appliance, and the like. The sensor can operate inline (installed as an appliance within the network, so that traffic flows through it); as a tap (network traffic between the clients and servers is copied by the tap to the sensor which is essentially invisible to the other network entities); or in a span (traffic is spanned off either the server side or the client side of a router or switch, copying both the incoming and outgoing traffic from any of the ports). The sensor can collect information on the packets which it sees, and can be configured to transmit the collected packet information for individual packets, summaries of packets, reports, and/or as detected events. Examples of such sensors include a Sourcefire™ sensor, a McAfee™ sensor, and the like.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A system, comprising:
   a processor device configured to:
   receive reports of operating system identities for a single host;
   determine a report-type of each of the reports, wherein a report-type is a type of fingerprinting method used to generate the reports;
   add together the operating system identities in the reports which have a same report-type to provide, for each of different report-types, a single additive report of operating system identities;
   determine which of the operating system identities are an intersection of the reported operating system identities in the single additive reports of the different report-types; and
   assign the intersection of the reported operating system identities of the single additive reports of the different report-types as a resolved operating system identity,
   wherein
   one report of operating systems is one set of plural different operating system identities to which one host fingerprint maps, and
   the intersection of the reported operating system identities is calculated as a set intersection among the operating system identities of the single additive reports for the different report-types for the single host.

2. The system of claim 1, further comprising assigning more weight to a more reliable type of fingerprint, and providing a confidence level to the resolved operating system identity.

3. The system of claim 1, further comprising assigning different weights to a same operating system identity based on a fingerprinting method that was used to relate the operating system to a reciprocating host.

4. The system of claim 1,
   the reports being a passively detected report, an actively identified report and a manually input report,
   further comprising pre-defining a preference relationship among the passively detected report, the actively identified report and the manually input report that defines which type of report to prefer when there is an unresolvable conflict among the reports of operating system identities for the single host.

5. The system of claim 4, further comprising generating an alert when it is determined that there is the un-resolvable conflict among the reports of operating system identities for the single host.

6. A method, comprising:
   in a processor device, receiving reports of operating system identities for a single host;
   in the processor device, determining a report-type of each of the reports, wherein a report-type is a type of fingerprinting method used to generate the reports;
   in the processor device, adding together the operating system identities in the reports have a same report-type to provide, for each of different report-types, a single additive report of operating system identities;
   in the processor device, determining which of the operating system identities are an intersection of the reported operating system identities in the single additive reports of the different report-types; and
   assigning the intersection of the reported operating system identities of the single additive reports of the different report-types as a resolved operating system identity,
   wherein
   one report of operating systems is one set of plural different operating system identities to which one host fingerprint maps, and
   the intersection of the reported operating system identities is calculated as a set intersection among the operating system identities of the single additive reports for the different report-types for the single host.

7. The method of claim 6, further comprising assigning more weight to a more reliable type of fingerprint, and providing a confidence level to the resolved operating system identity.

8. The method of claim 6, further comprising assigning different weights to a same operating system identity based on a fingerprinting method that was used to relate the operating system to a reciprocating host.

9. The method of claim 6,
the reports being a passively detected report, an actively identified report and a manually input report,
further comprising pre-defining a preference relationship among the passively detected report, the actively identified report and the manually input report that defines which type of report to prefer when there is an un-resolvable conflict among the reports of operating system identities for the single host.

10. The method of claim 9, further comprising generating an alert when it is determined that there is the un-resolvable conflict among the reports of operating system identities for the single host.

11. An apparatus configured to perform the method of claim 6.

12. A non-transitory computer readable medium comprising executable instructions for performing the method of claim 6.

13. A non-transitory computer-readable storage medium comprising computer-executable instructions for performing the steps of:
in a processor device, receiving reports of service identities for a single host;
in the processor device, determining a report-type of each of the reports, wherein a report-type is a type of fingerprinting method used to generate the reports;
in the processor device, adding together the service identities in the reports which have a same report-type to provide, for each of different report-types, a single additive report of service identities;
in the processor device, determining which of the service identities are an intersection of the reported service identities in the single additive reports of the different report-types; and
assigning the intersection of the reported service identities of the single additive reports of the different report-types as a resolved service identity,
wherein
one report of service identities is one set of plural different service identities to which one host fingerprint maps, and
the intersection of the reported service identities is calculated as a set intersection among the service identities of the single additive reports for the different report-types for the single host.

14. The medium of claim 13, further comprising assigning more weight to a more reliable type of fingerprint, and providing a confidence level to the resolved service identity.

15. The medium of claim 13, further comprising assigning different weights to a same service identity based on a fingerprinting method that was used to relate the service to a reciprocating host.

16. The medium of claim 13,
the reports being a passively detected report, an actively identified report and a manually input report,
further comprising pre-defining a preference relationship among the passively detected report, the actively identified report and the manually input report that defines which type of report to prefer when there is an un-resolvable conflict among the reports of service identities for the single host.

17. The medium of claim 16, further comprising generating an alert when it is determined that there is the un-resolvable conflict among the reports of service identities for the single host.

* * * * *

UNITED STATES PATENT AND TRADEMARK OFFICE
CERTIFICATE OF CORRECTION

| | | |
|---|---|---|
| PATENT NO. | : 8,671,182 B2 | Page 1 of 1 |
| APPLICATION NO. | : 12/820227 | |
| DATED | : March 11, 2014 | |
| INVENTOR(S) | : William Andrew Vogel, III et al. | |

It is certified that error appears in the above-identified patent and that said Letters Patent is hereby corrected as shown below:

In the claims
Column 14, Line 52, insert the word --which-- after the word "reports"

Signed and Sealed this
Thirteenth Day of October, 2015

Michelle K. Lee
*Director of the United States Patent and Trademark Office*